(No Model.)
H. VAN ALTENA.
FISHING TACKLE.
No. 279,206. Patented June 12, 1883.
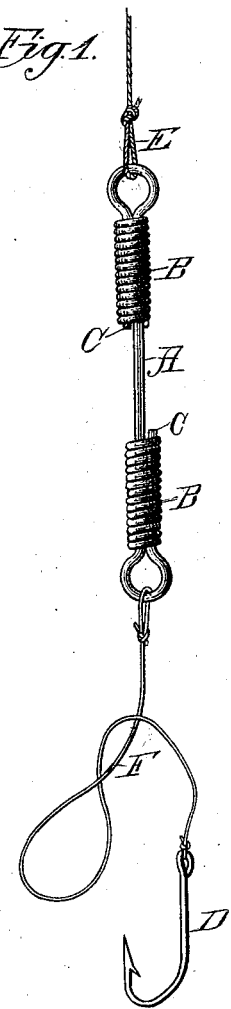
Witnesses:
E. G. Asmus
Wm Sinnott
Inventor:
Henry Van Altena
By Jas. B. Erwin
Attorney.

UNITED STATES PATENT OFFICE.

HENRY VAN ALTENA, OF MILWAUKEE, WISCONSIN.

FISHING-TACKLE.

SPECIFICATION forming part of Letters Patent No. 279,206, dated June 12, 1883.

Application filed September 28, 1882. (No model.)

*To all whom it may concern:*

Be it known that I, HENRY VAN ALTENA, a citizen of the United States, residing at Milwaukee, in the county of Milwaukee and State of Wisconsin, have invented certain new and useful Improvements in Fishing-Tackle; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in fishing-tackle, and pertains to the device for attaching the hook and sinkers to the line, all of which is further explained by reference to the accompanying drawings, in which—

Figure 1 represents a side view, showing one manner of attaching the device with single hook. Fig. 2 is a side view, part in section. Fig. 3 is a side view of the device provided with solid metallic sinkers.

Like parts are represented by the same reference-letters throughout the several views.

A is flexible metallic rod or wire for supporting the sinkers B B. The rod is interposed between the line and hook. Said rod is provided with loops C C, which are adapted to spring open when the sinkers B are drawn from over them, when one of the loops is inserted through the eye D' of the hooks D D, and the other end through the loop E of the line.

F is a catgut cord which is interposed between the rod A and the hook.

When two hooks are used, their points are retained in opposite directions to each other by the loop which supports them. The sinkers B B are formed of a spiral wire coil, which is loosely fitted to the rods A, and are readily slid from the end of the loops when it is desired to disengage them from the hook or line. B' B' represent solid metallic sinkers, which may, if desired, be substituted for the wire sinkers, the rods A being equally adapted to be used with either form of sinkers shown.

Having thus described my invention, what I claim as new, and desire to secure by Letters Patent, is—

1. The combination of the rod A, provided with loops C C, with sliding sinkers adapted to retain the loops in a closed position, substantially as set forth.

2. The combination, with the rod A, of spiral-wire sinkers adapted to retain the loops at its respective ends in a closed position, as shown.

3. The combination of the line E, rod A, sinkers B, cord F, and hook D, substantially as shown.

In testimony whereof I affix my signature in presence of two witnesses.

HENRY VAN ALTENA.

Witnesses:
E. G. ASMUS,
WM. SINNOTT.